ature or provided Fresno to be a patent

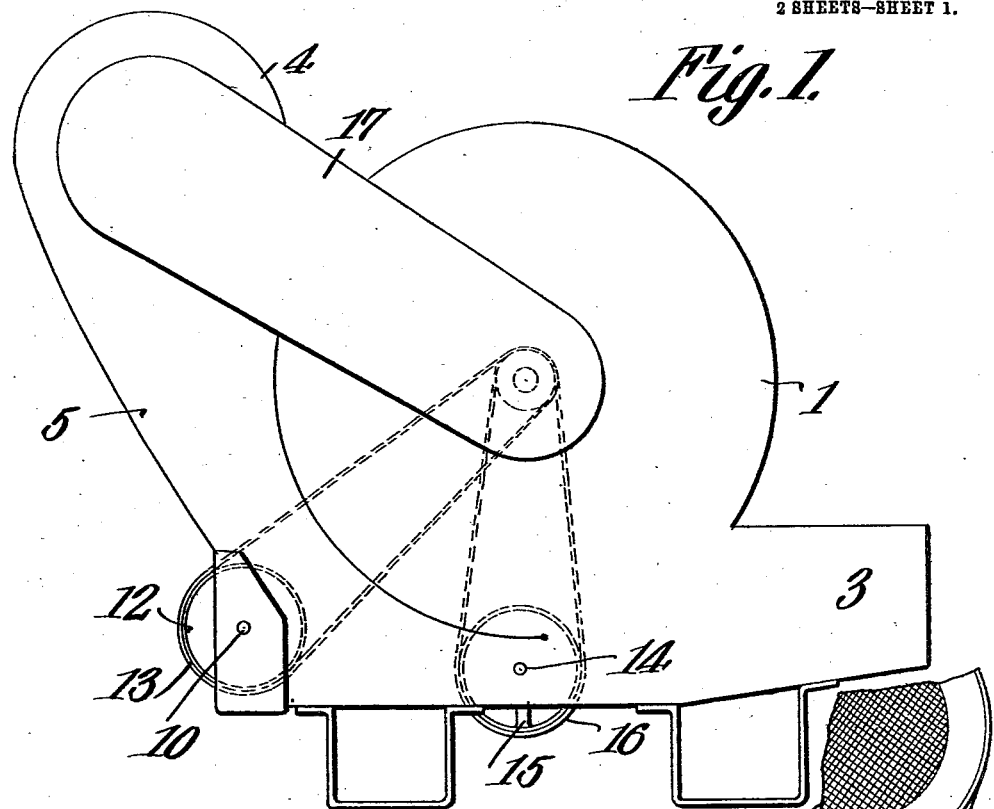
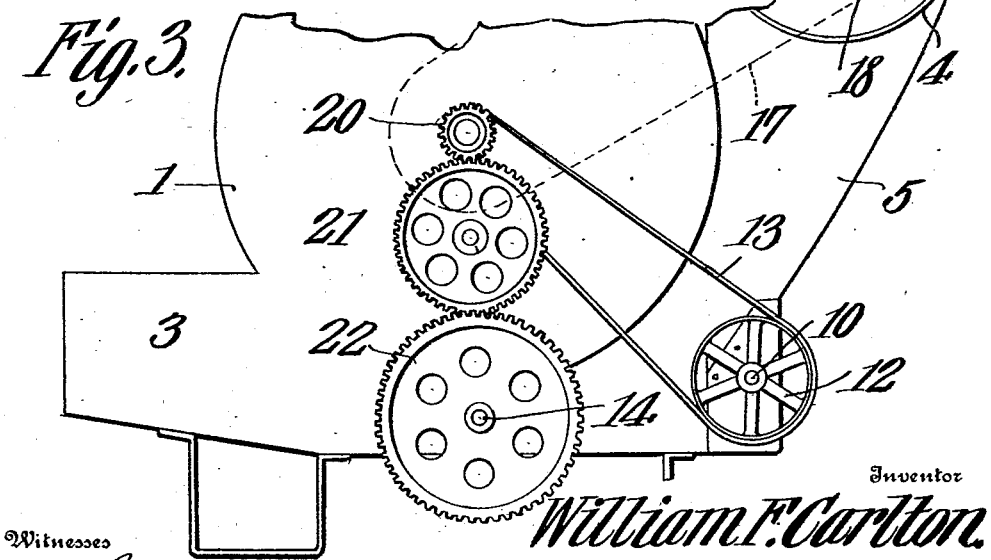

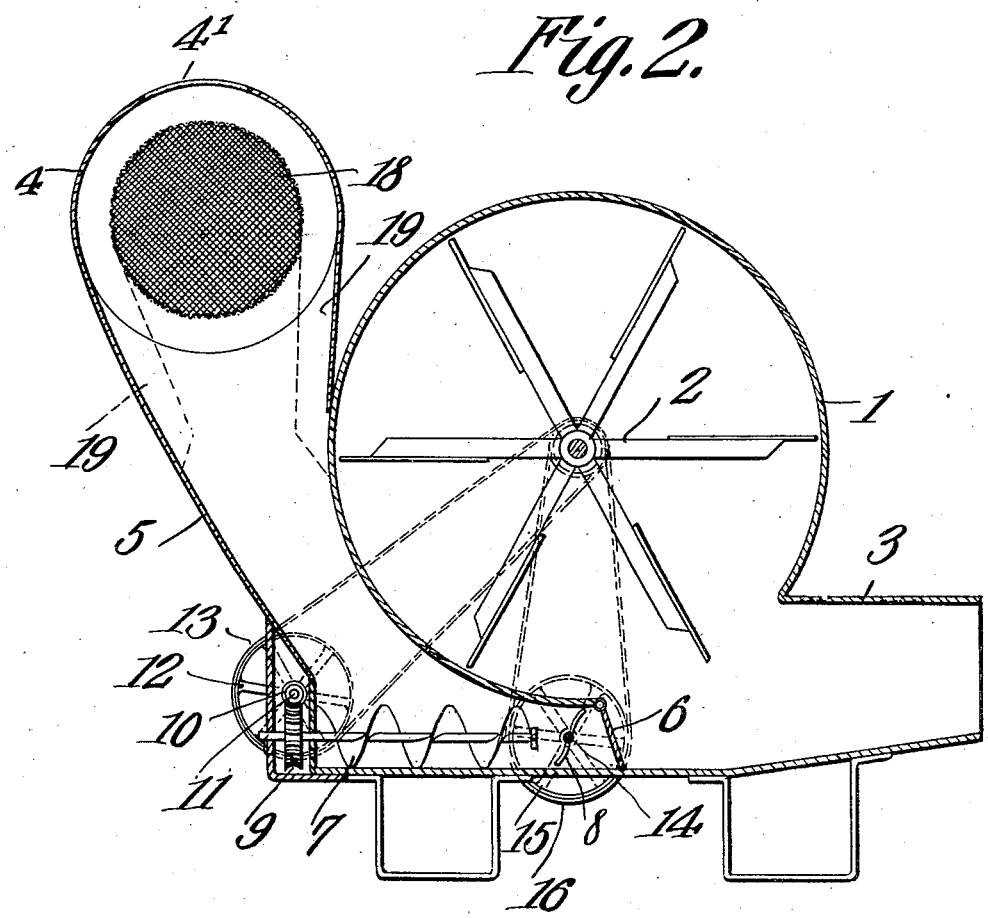

UNITED STATES PATENT OFFICE.

WILLIAM F. CARLTON, OF ADVANCE, MISSOURI.

PNEUMATIC GRAIN-CONVEYER.

No. 908,445.　　　　Specification of Letters Patent.　　　　Patented Jan. 5, 1909.

Application filed March 3, 1908. Serial No. 419,012.

*To all whom it may concern:*

Be it known that I, WILLIAM F. CARLTON, a citizen of the United States, residing at Advance, in the county of Stoddard and State of Missouri, have invented a new and useful Pneumatic Grain-Conveyer, of which the following is a specification.

This invention has relation to pneumatic grain conveyers and it consists in the novel construction and arrangement of its parts as hereinafter shown and described.

The object of the invention is to provide a conveyer of the character indicated which is adapted to actuate the material in consequence of suction force and propelling force incident to a draft or blast of air. The parts being so arranged that the grain does not come in contact with the rotor or other means which create the suction and propelling forces. In the present instance a fan is employed as a means for drawing and propelling an air column and as the grain does not come in contact with the blades of the fan the grain is not injured thereby nor does the grain wear the fan by coming forcibly in contact therewith.

In the accompanying drawings: Figure 1 is a side elevation of the conveyer. Fig. 2 is a vertical sectional view of the same, and Fig. 3 is an elevation of a portion of a modified form of conveyer.

The conveyer consists of the fan casing 1 in which the fan 2 is mounted for rotation. Said casing is provided with an outlet 3. A grain pipe (not shown) is connected with the opening 4' of the drum 4 which is located above the hopper 5. The lower end of said hopper communicates with the interior of the lower portion of the fan casing 1 and is provided with a valve 6 which normally bears at its lower edge against the bottom of the casing 1 and prevents any back draft from the casing 1 through the hopper 5 but permits material to pass from the hopper 5 into the casing 1. The feed auger 7 is journaled for rotation in the bottom of the hopper 5 and is adapted to force material toward the valve 6. The rotating feeder 8 is located between the end of the feed auger 7 and the valve 6 and is adapted to positively force material from the bottom of the hopper 5 under the valve 6 and into the casing 1. Both the feeder and the feed auger derive their movement from the shaft of the fan 2. The shaft of the auger 7 is provided with a worm wheel 9 with which the worm gear 10 meshes. The said gear 10 is mounted upon the shaft 11 as is also the belt pulley 12. The belt 13 passes around the pulley 12 and a pulley located upon the shaft of the fan 2. The feeder 8 is mounted upon the shaft 14 as is also the belt pulley 15, the belt 16 passes around the pulley 15 and a pulley mounted upon the shaft of the fan 2. The by-pass 17 communicates at one end with the end of the drum 4 and at its opposite end with the air inlet of the fan casing 1. The upper end of the said by-pass is covered with a foraminous cap 18 which is located in the drum 4 and which is provided with the depending sections 19 which bear against the sides of the hopper 5 and hold the same in place.

The operation of the conveyer is as follows: The fan 2 is rotated and grain is admitted into the drum 4, as the said fan rotates the air is drawn from the drum 4 through the by-pass 17 into the casing 1 and is expelled by the fan through the outlet 3. The suction created by the fan through the by-pass 17 augments the introduction of the grain into the drum 4 and the foraminous cap 18 prevents any of the grain from entering the by-pass 17. Consequently, the grain that enters the drum 4 falls into the hopper 5 and is forced by the auger 7 toward the feeder 8. The said feeder forces the said grain under the valve 6 and into the casing 1 where it is caught up by the blast of air forced through the outlet 3 and is borne along with the same. Thus it will be observed that the movement of the grain is actuated by the suction and propelling forces of the fan without coming in actual contact with the fan. As the fan removes the air from the grain through the by-pass 17 much of the moisture carried by the grain is removed with the air and the grain is materially dried.

In the form of arrangement shown in Fig. 3 the belt pulley 15 and belt 16 are dispensed with and the chain of gears 20, 21 and 22 are used in lieu thereof for the purpose of transmitting movement from the fan shaft to the feeder shaft 14. It will therefore appear that any desired and known means may be employed for transmitting movement from the fan shaft to the other movable parts.

Having described my invention what I claim as new and desire to secure by Letters Patent is:—

A conveyer comprising means for imparting suction and propelling forces to a column of air, means for separating material from that portion of the column actuated by suction and for introducing said material into that portion of the column actuated by propulsion and a check valve located in the path of the material when moving from one of the said portions of the air column to the other.

In testimony that I claim the foregoing as my own, I have hereto affixed my signature in the presence of two witnesses.

WILLIAM F. CARLTON.

Witnesses:
C. A. SCHONHOFF,
E. C. WILSON.